Feb. 1, 1955 E. L. DETROW 2,700,854
RADIAL CLEARANCE TAP-GRINDING FIXTURE
Filed Jan. 30, 1953 6 Sheets-Sheet 1
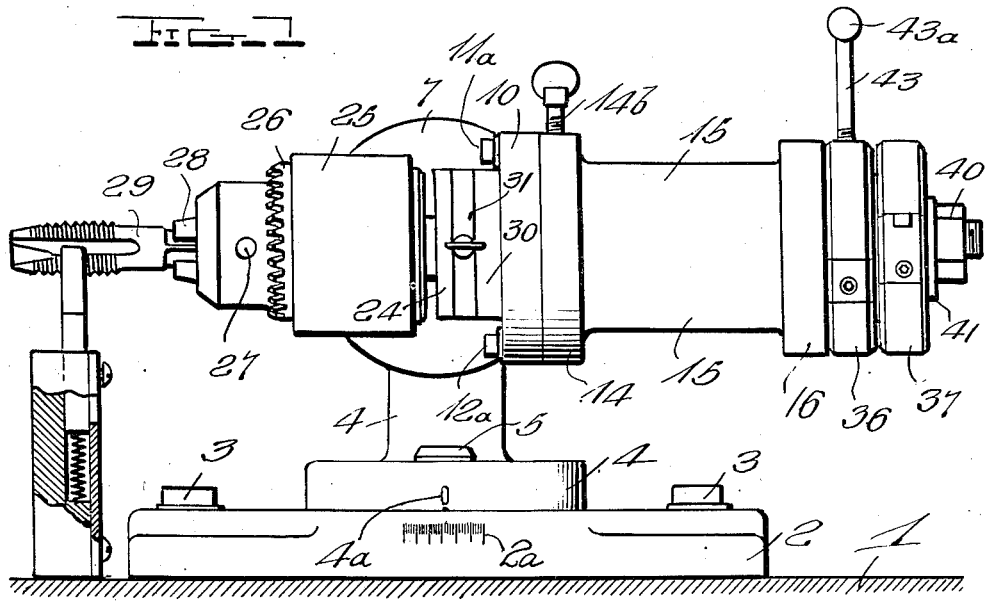
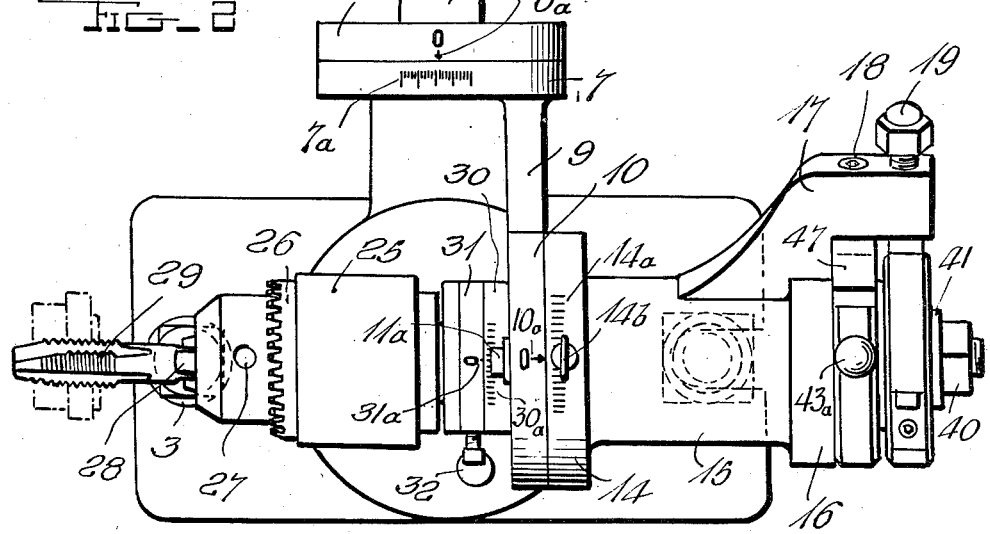
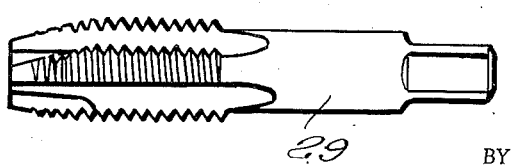
INVENTOR
Edgar L. Detrow,
BY
John B. Brady
ATTORNEY

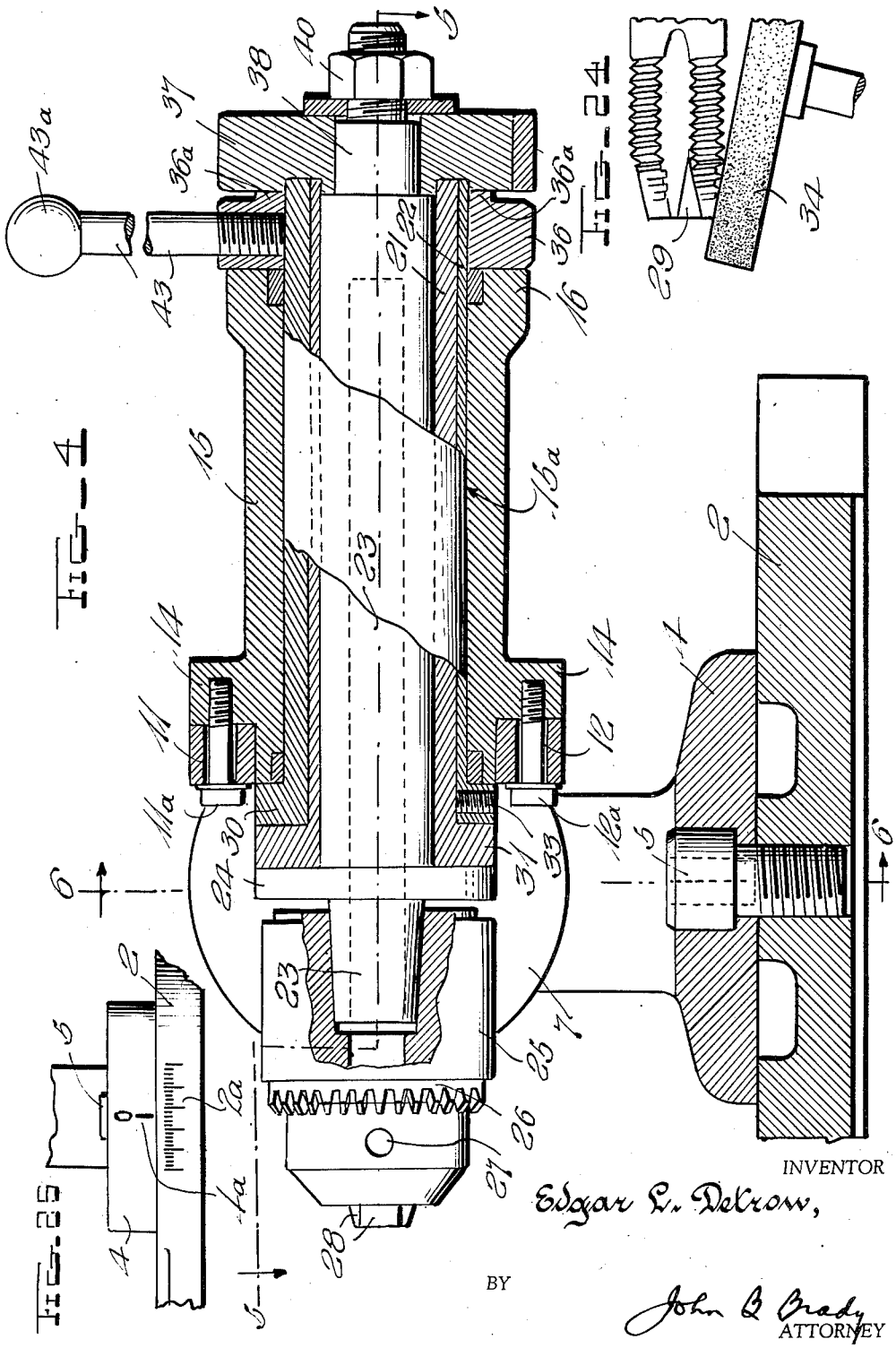

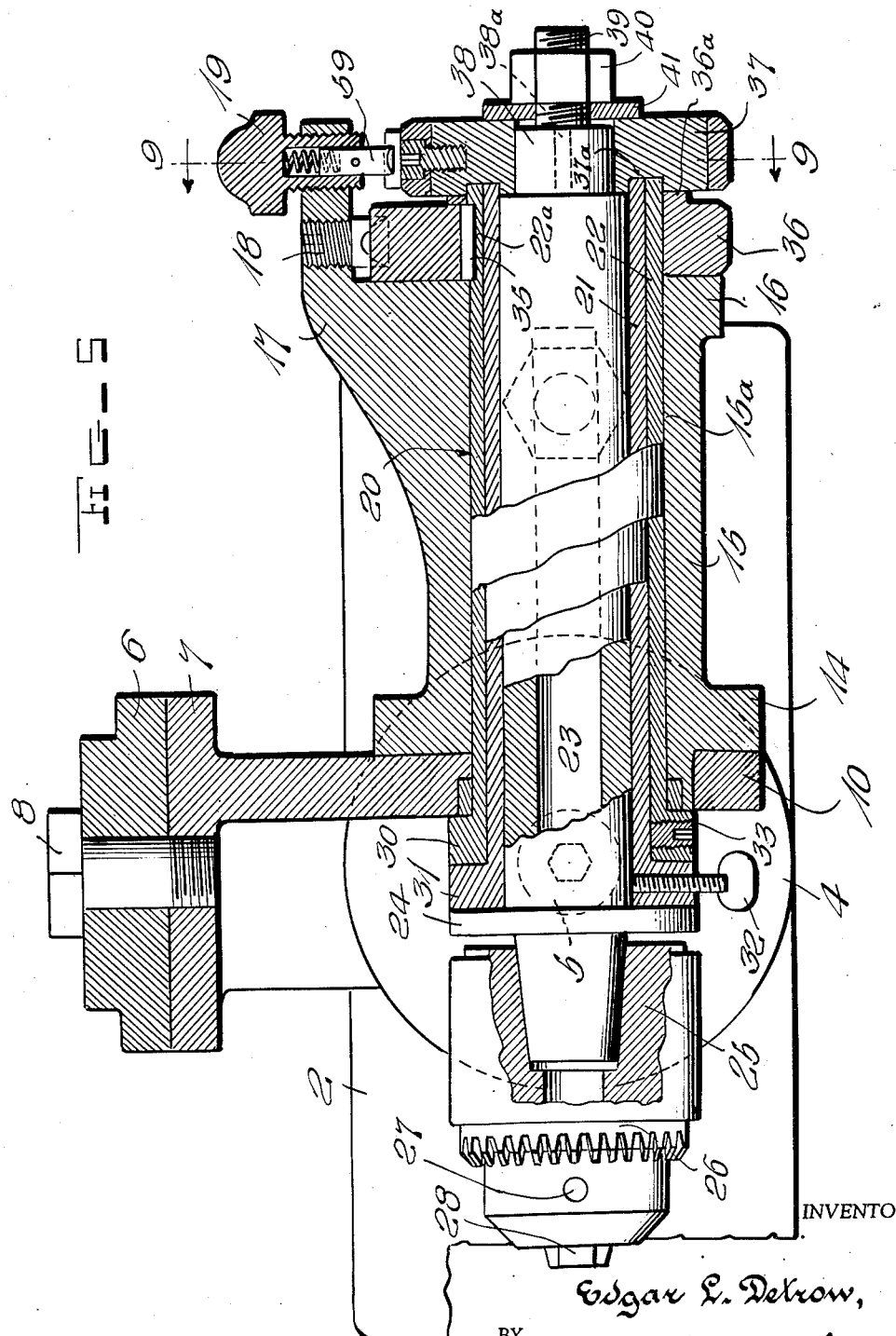

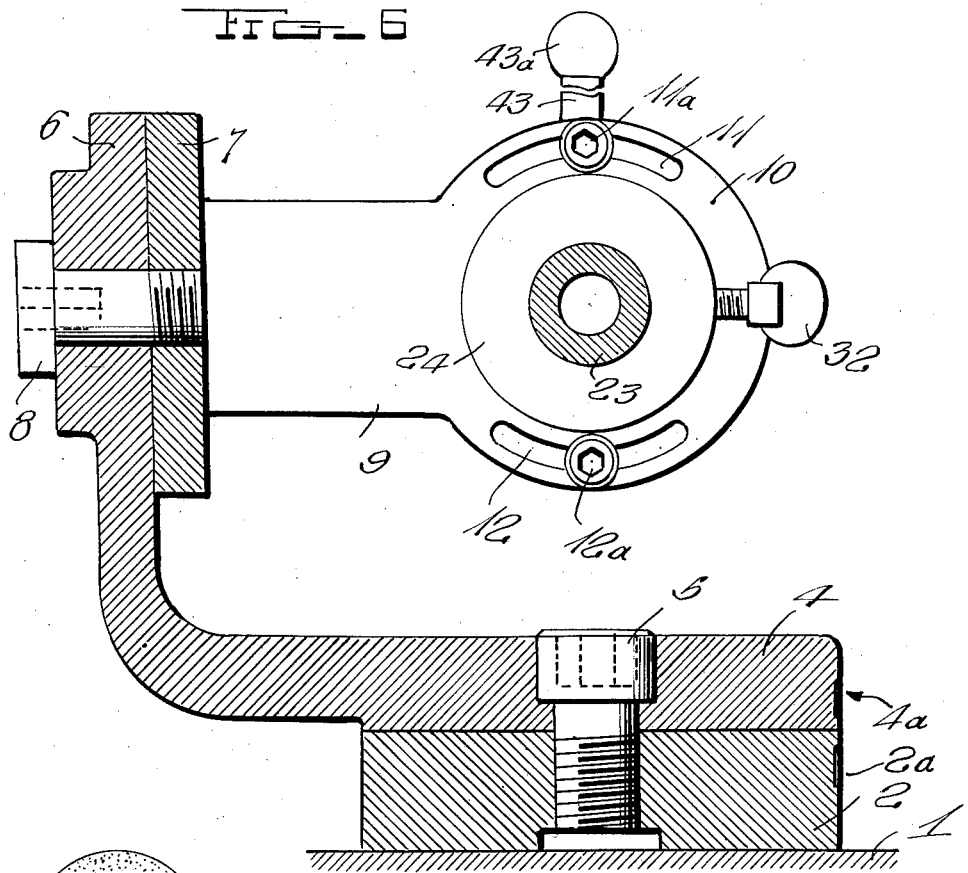

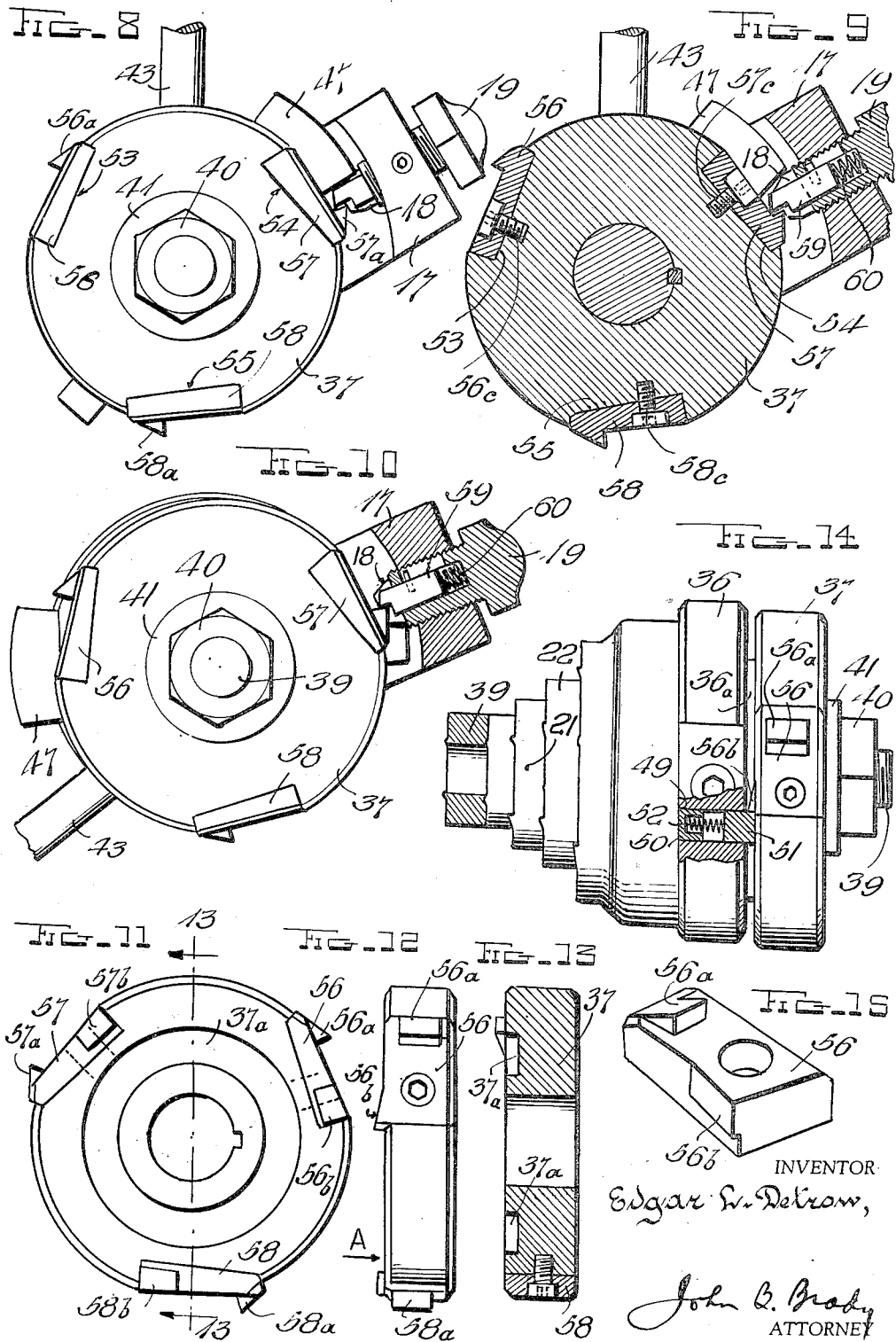

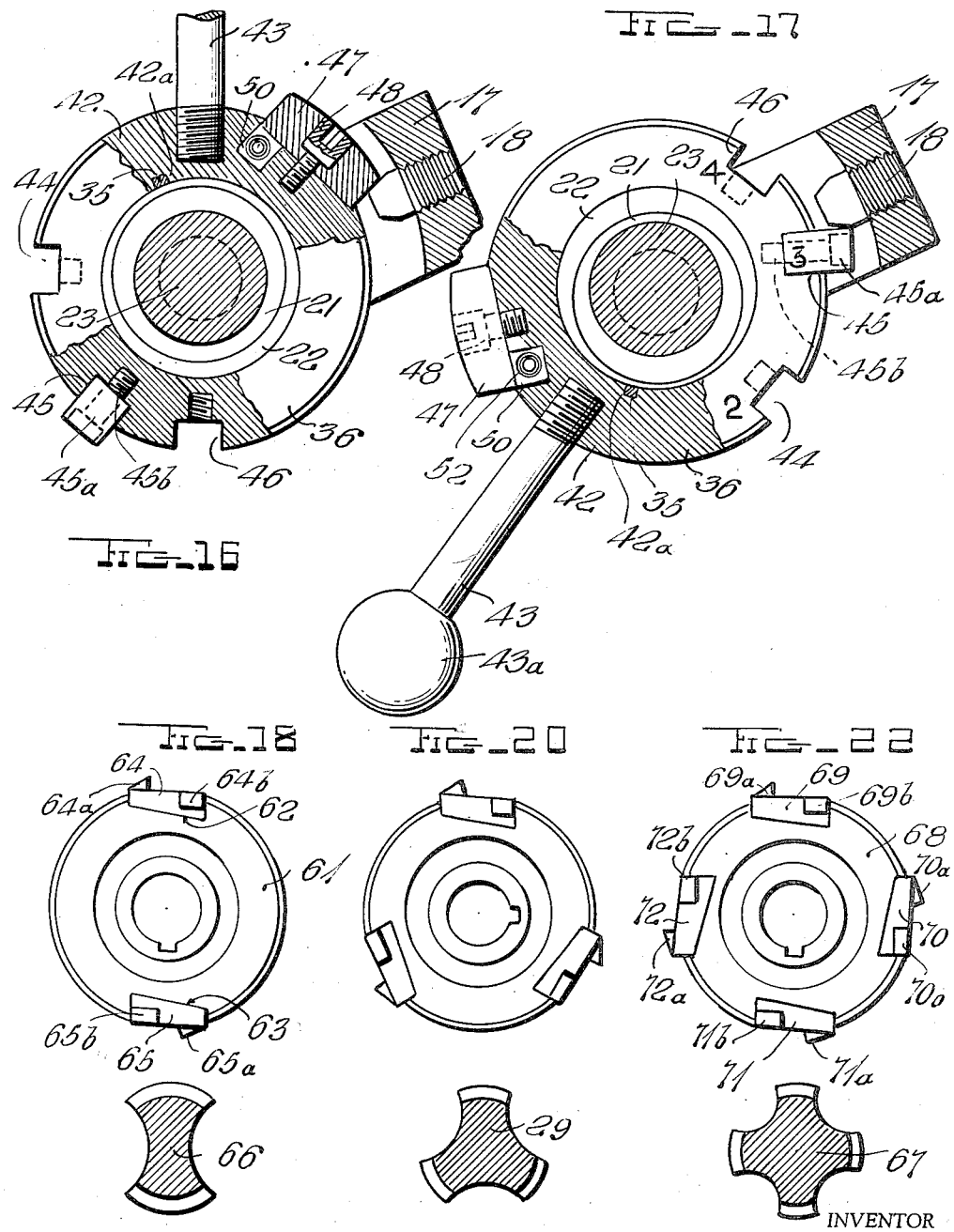

United States Patent Office 2,700,854
Patented Feb. 1, 1955

2,700,854

RADIAL CLEARANCE TAP-GRINDING FIXTURE

Edgar L. Detrow, Boonsboro, Md., assignor to Vulcan Machine Company, Waynesboro, Pa., a corporation of Pennsylvania Application January 30, 1953, Serial No. 334,246

12 Claims. (Cl. 51—234)

My invention relates broadly to machine tools and more particularly to a tap-grinding fixture for facilitating the precision grinding and sharpening of taps.

One of the objects of my invention is to provide a construction of tap-grinding fixture adapted for operation with a wide variety of taps of differing numbers of flutes for facilitating the precision grinding and sharpening of such taps.

Another object of my invention is to provide a construction of tap-grinding machine in which the tap to be ground is mounted in a chuck for presentation of the tap faces to a grinding wheel and the tap controlled through an eccentric path of movement rotating away from the grinding wheel according to a predetermined curve for insuring the precise grinding of the tap faces.

Another object of my invention is to provide a construction of tap-grinding fixture which includes a chuck for presenting the tap to be ground to a grinding wheel and including means for predetermining the path of movement of the faces of the tap which are to be ground according to the number of flutes in the tap.

Still another object of my invention is to provide a construction of tap-grinding fixture having means for applying thereto different indexing plates according to the number of flutes in the tap to be ground, whereby a controlled eccentric path of movement may be imparted to the taps to be ground according to an indexing plate applied to the fixture for insuring the precision grinding of taps according to their numbers of flutes.

Still another object of my invention is to provide a construction of tap-grinding fixture including a tap-mounting chuck which may be adjusted through a combination of horizontal, vertical, axial and orbital paths through predetermined angular increments of movement where each face to be ground is presented to the grinding wheel and eccentrically backed off from the wheel during the grinding operation for accurately grinding the faces of the tap according to a precalibrated pattern.

Still another object of my invention is to provide means for eccentrically supporting taps of different numbers of flutes to be ground and sharpened, including adjustable means for confining the movement of the tap during the grinding operation, in an eccentric or orbital path controlled by the coaction of an indexing plate with an actuating plate for insuring the removal of only a limited amount of material from the tap in effecting a grinding and sharpening operation.

Other and further objects of my invention reside in a substantially universally adjustable tap-grinding fixture having means for eccentrically moving a tap to be ground in an orbital path with respect to a grinding wheel and/or sharpening the insides of the flutes and for presenting negative rake grind surfaces on the flute faces.

Other and further objects of my invention reside in a construction of tap-grinding fixture capable of supporting a tap to be ground and controlling the movement thereof through a predetermined grinding path for insuring the precision sharpening thereof without the necessity of employing the skill of a machinist, as set forth more fully in the specification hereinafter following, by reference to the accompanying drawings, in which:

Figure 1 is a front elevational view of the tap-grinding fixture of my invention and illustrating a tap being set in position therein prior to the gripping of the tap solidly within the jaws of the chuck of the tap-grinding fixture and preparatory for the grinding operation; Fig. 2 is a plan view of the tap-grinding fixture shown in Fig. 1; Fig. 3 is a view of the type of tap with which the grinding fixture of my invention is intended to operate; Fig. 4 is a central vertical longitudinal section through the tap-grinding fixture of my invention; Fig. 5 is a horizontal sectional view taken on line 5—5 of Fig. 4; Fig. 6 is a transverse sectional view taken substantially on line 6—6 of Fig. 4; Fig. 7 shows the manner in which the tap-grinding fixture may be tilted for performing a grinding operation between the flutes of the tap; Fig. 8 is an elevational view of one of the plates employed in the tap-grinding fixture of my invention, the indexing plate illustrated being provided for the control of the movement of a three-flute tap, and the view showing the position of the indexing plate for the uppermost position of the control handle of the coacting actuating plate; Fig. 9 is a view taken transversely through the indexing plate on line 9—9 of Fig. 5; Fig. 10 is an end elevational view of the indexing plate shown in Figs. 8 and 9 and illustrating the indexing plate with the coacting actuating plate moved to the limit of one of its actuated positions and showing the mounting for the detent which restrains the indexing plate in section; Fig. 11 is a rear view of the indexing plate for a three-flute tap looking in the direction of arrow A in Fig. 12; Fig. 12 is an edge view of the indexing plate shown in Fig. 11; Fig. 13 is a vertical sectional view taken on line 13—13 of Fig. 11; Fig. 14 is a view illustrating the assembly and coaction of the indexing plate and the actuating plate for the tap-grinding fixture in accordance with my invention with certain of the parts broken away and shown in section; Fig. 15 is a perspective view showing one of the insertable ratchet members employed in the indexing plate in the assembly of my invention; Fig. 16 is a vertical sectional view through the actuating plate for the assembly of my invention with certain of the parts illustrated in elevation, the view showing the uppermost limiting position for the actuating plate prior to the angular movement of the actuating plate for backing off the tap from the grinding wheel; Fig. 17 is a view similar to the view illustrated in Fig. 16 but showing the actuating plate oriented to its lowermost limit of movement where the tap has been fully backed away from the grinding wheel; Figs. 18, 20 and 22 illustrate the arrangement of the indexing plates for use in the tap-grinding fixture of my invention when the fixture is used for the grinding of two-flute taps of the kind shown in section in Fig. 19, or for three-flute taps of the kind shown in section in Fig. 21, or four-flute taps of the kind shown in section in Fig. 23, respectively; Fig. 24 illustrates the manner in which the grind wheel is presented to the tap to be ground; and Fig. 25 is a fragmentary view illustrating the manner in which calibrations are provided on the base of the fixture for facilitating adjustment of the fixture in a horizontal plane.

My invention is directed to a construction of precision type tap-grinding fixture having means for practically universally orienting a tap to be ground with respect to the surface of a grinding wheel. The fixture of my invention is provided with a set of independent indexing plates which are separately used on the fixture for controlling the operation of the fixture when used with taps having different numbers of flutes. That is to say, I provide a two-ratchet indexing plate for use in grinding and sharpening taps of two-flute construction; I provide a three-ratchet indexing plate for use in the fixture when grinding and sharpening taps of three-flute construction; and I provide an indexing plate of four-ratchet construction when the machine is used in grinding and sharpening taps of four flutes. The indexing plate is readily removable from and insertable on one end of the spindle shaft and coacts with a detent carried by a bracket extending from the cylindrical body of the fixture for controlling the movement of the spindle shaft through predetermined angular increments of distance. The actuating plate which is disposed immediately adjacent the indexing plate is supported on an outer sleeve of a pair of eccentrically mounted sleeves which extend through the bore of the cylindrical body and serve as mounting means for the chuck spindle. The actuating plate interconnects with the indexing plate through a ratchet and detent connection, enabling successive increments of angular movement to be imparted to the eccentric sleeve assembly within which the chuck spindle is mounted. By virtue of this mounting, the tap clamped in the jaws of the chuck on the chuck spindle is moved in a predetermined path under control of the increments of successive movement of the actuating plate for insuring the presentation of the faces of the tap to a grinding wheel and the backing off of the said faces from the grinding wheel for removing only a limited amount of material from the tap sufficient to insure a precision sharpening thereof. The two sleeves of the eccentric sleeve assembly are mutually adjustable to predetermine the desired orbital movement of the tap, and the cylindrical body which supports the eccentric sleeve assembly is also adjustable axially of the fixture with associated calibrated scales provided for insuring the accurate control of the path of movement of the tap during the grinding operation.

Referring to the drawings in detail, reference character 1 designates a supporting base on which the tap-grinding fixture of my invention is mounted, the fixture including a base 2 attached to supporting base 1 by means of screws 3. The base 2 provides mounting means for the revolvable bracket 4 which is pivoted by means of pintle 5 to the base 2. The bracket 4 extends vertically and terminates in a circular head 6 which forms a support for the aligned revolvable head 7. The circular head 6 carries a zero mark calibration 6a thereon with which there is registered the graduations 7a carried by the revolvable head 7. The revolvable head 7 is adjustably connected with circular head 6 by means of adjustable screw 8 which may be loosened to allow revolvable head 7 to be oriented with respect to circular head 6. The revolvable head 7 carries a forwardly extending bracket 9 disposed off center with respect to revolvable head 7 and terminating in a ring member 10. The ring member 10 includes two arcuate laterally extending slots 11 and 12 against which the end flange 14 of the substantially cylindrical body structure 15 abuts. Adjustable securing screws 11a and 12a pass through laterally disposed slots 11 and 12 and into the end flange 14 and may be tightened against the side wall of the ring member 10 for securing the body structure 15 in an adjusted position. Such adjusted position is determined by observation of the zero mark calibration 10a carried by the peripheral face of ring member 10 and the calibrations 14a carried by the peripheral face of end flange 14.

The body structure 15 is provided at its opposite end with an end flange 16 from which there projects a bracket member 17 providing a support for receiving a screw-threaded stop 18 and a screw-threaded detent guide 19 in aligned positions. The body structure 15 has a cylindrical bore 15a extending longitudinally there-through for receiving a cylindrical tube assembly 20 consisting of a pair of eccentric tubular sleeves 21 and 22 formed on 180-degree oppositely disposed eccentrics so that by mutual adjustment of one sleeve with respect to the other a multiplicity of eccentric positions of the hollow chuck spindle 23, which is supported within eccentric sleeve 21, may be obtained. The hollow chuck spindle 23 extends the entire length of the eccentric sleeves 21 and 22 and projects beyond ring member 10 at one end and substantially beyond the end of the body structure 15 at the other end. The hollow chuck spindle 23 carries an abutment flange 24 which abuts against the face of ring member 31 and carries the adjustable chuck 25. The adjustable chuck 25 is provided with conventional circular rack 26 engageable by a tooth-head wrench, the spindle of which is adapted to be inserted into any one of a plurality of sockets 27, where the teeth of the wrench engage the rack 26 enabling the jaws 28 of the adjustable chuck to be opened and closed for receiving the fluted tap to be sharpened shown at 29 and serving to guide the tap while the tap is loosely fitted within the jaws and/or grip the tap when the jaws of the chuck are tightened against the shank of the tap.

The eccentric sleeves 21 and 22 are each provided with circular flanges shown at 31 and 30, respectively, the flange 31 on inner sleeve 21 including a radially extending adjustable winged head screw 32 operative when tightened to unite inner sleeve 21 with spindle 23. The flange 30 on outer eccentric sleeve 22 is provided with the radially extending set screw 33 for uniting outer sleeve 22 with respect to inner sleeve 21. When winged head screw 32 and set screw 33 are both loosened, the eccentric sleeves 21 and 22 may be revolved to a mutual position providing that degree of eccentricity of spindle 23 as will properly position the tap 29 carried in jaws 28 for presentation to the grinding wheel 34 shown schematically in Fig. 24. To facilitate the precision adjustment of the eccentricity of the sleeves 21 and 22, the annular surface of flange 31 is provided with a zero mark calibration 31a and the annular surface of flange 30 is provided with graduations 30a as represented in Fig. 2, enabling the eccentric sleeves to be positioned in the desired mutual relationship.

The sleeves 21 and 22 project beyond the end flange 16, and outer sleeve 22 is provided with a key slot 22a in which key 35 is positioned. Key 35 serves as a means for keying the actuating disc 36 to the cylindrical tube assembly 20. The actuating disc 36 has an annular projecting face 36a thereon which serves as a spacing means for the adjacent indexing plate 37. The indexing plate 37 is supported on the end of the chuck spindle 23 formed of reduced section as shown at 38 and from which the screw-threaded end extends and which is engaged by the securing nut 40 which bears against the washer member 41. The indexing plate 37 is provided with an annular groove 37a in the face thereof adjacent the actuating disc 36 for receiving the projecting ends of the inner and outer eccentric sleeves 21 and 22.

The actuating disc 36 is shown more clearly in Figs. 16 and 17 from which it will be noted that the disc includes the central ring member 42 having key-way 42a therein which engages the key 35 carried by the outer sleeve 22. The actuating disc 36 has actuating lever 43 extending radially therefrom and terminating in hand grip 43a by which the actuating disc is manually moved. The actuating disc 36 is provided on its periphery with transversely extending slots 44, 45 and 46 which are variously spaced for receiving attachable and detachable stops in the form of lineally extending bars. The bars are inserted in the slots and secured thereto by screws which pass through the bars and engage screw-threaded recesses in actuating disc 36. In Fig. 16 I have shown a bar 45a in position and secured by a screw 45b extending there-through and engaging internal screw threads in actuating disc 36. The bars are selectively placed in position depending upon the number of flutes in the taps to be ground. The actuating disc 36 carries a transversely disposed reference stop 47 secured in position by screw 48 in a position adjacent the lever 43. Reference stop 47 coacts with the screw-threaded stop 18 carried in bracket 17 and against one side of which reference stop 47 abuts as the lever 43 is moved in an upward direction or in a clockwise direction when viewed from the indexing plate end of the fixture. The bar which is mounted in any one of the slots 44, 45 and 46 abuts against the opposite side of the screw-threaded stop 18, as represented in Fig. 17, when the lever 43 is moved in a counter-clockwise direction, looking at the indexing plate end of the fixture. The extent of the angular path of movement of the tap 29 carried in the chuck jaws 28 is determined by the spatial distance between reference stop 47 and the attachable and detachable bars represented by bar 45a.

The actuating plate 36 is transversely slotted as represented at 49 beneath the peripheral portion of the actuating disc 36 which receives reference stop 47, and through this slot there is positioned a socket 50 for mounting a spring-actuated detent 51 which is transversely urged by a spring 52 to a position establishing a ratchet connection with ratchet teeth formed on one side of the indexing plate 37.

Figs. 8-15 and 18, 20 and 22 show an arrangement of the indexing plate in more detail. The indexing plate 37 illustrated in Figs. 8-15 is intended for operation with a three-flute tap. A set of these indexing plates is provided for use with the tap-grinding fixture in the grinding of taps of two-flute, three-flute and four-flute types, the arrangement being as set forth in Figs. 18, 20 and 22 for the tap shown in section in Figs. 19, 21 and 23, respectively. The indexing plates are recessed on their peripheries as indicated, for example, in Figs. 8-11 where indexing plate 37 is peripherally recessed at 53, 54 and 55 for receiving the ratchet members represented at 56, 57 and 58 and shown more particularly in Fig. 15 as represented by ratchet member 56. Each ratchet member is provided with an offset ratchet tooth represented at 56a, 57a and 58a on the portion thereof aligned with the periphery of the indexing plate and a ratchet tooth on the face thereof adjacent the actuating disc 36 as represented at 56b, 57b and 58b. The ratchet faces 56b, 57b and 58b are disposed at the ends of the ratchet members which are opposite the ratchet teeth 56a, 57a and 58a. The ratchet teeth 56b, 57b and 58b coact with the detent 51 transversely movable through actuating disc 36. The ratchet teeth 56a, 57a and 58a coact with the spring-pressed detent 59 carried in the detent guide 19 and continuously urged forward by means of detent spring 60 for successively operating as an abutment with respect to ratchet teeth 56a, 57a and 58a of ratchet members 56, 57 and 58 when the actuating disc 36 is moved in a counterclockwise direction looking at the indexing plate end of the grinding fixture. When the actuating disc is revolved in a clockwise direction, looking in the direction of the tap-grinding fixture, the inclined faces of the ratchet teeth 56a, 57a and 58a operate against the inwardly pressed end of the detent 59 enabling the detent to be raised as the indexing plate is revolved in a clockwise direction looking in the direction of the end of the indexing plate and permitting the indexing plate to be arrested as the actuating disc is moved to its limiting position after each successive operation thereof. The ratchet members 56, 57 and 58 are detachably mounted in the recesses 53, 54 and 55, respectively, and secured by means of detachable and removable screw members 56c, 57c and 58c.

The indexing plates for the two-flute and four-flute taps represented in Figs. 18 and 22 provide supporting means for two- and four-ratchet members, respectively, as shown in Figs. 18 and 22. Fig. 20 is representative of the three-flute tap indexing plate heretofore explained in connection with Figs. 8–15 for a three-flute tap, but it will be seen that for a two-flute tap the indexing plate is constructed as in Fig. 19 where indexing plate 61 is provided with diametrically opposite recesses 62 and 63 for detachably receiving the ratchet members 64 and 65. The ratchet members 64 and 65 have a construction which is identical with the construction of ratchet members 56, 57 and 58, including the outwardly directed ratchet faces 64a and 65a and laterally directed ratchet faces 64b and 65b. The two-flute tap with which the indexing plate 61 coacts is represented in Fig. 19 at 66. Indexing plate 61 is inserted on the key 38a of the portion of the spindle of reduced section shown at 38 in substitution for the indexing plate of Figs. 8–15 for enabling a two-flute tap to be ground as distinguished from a three-flute tap.

Similarly when it is desired to grind a four-flute tap such as 67 shown in Fig. 23, the previously used indexing plate is removed from the spindle and the four-flute indexing plate 68 shown in Fig. 22 positioned on the spindle. Indexing plate 68 carries ratchet members 69, 70, 71 and 72 disposed in quadrantal positions about the periphery of the indexing plate for control by the detent 59 in engagement with outwardly projecting ratchet faces 69a, 70a, 71a and 72a and controlled by laterally extending detent 51 carried by the actuating plate 36 and engageable with the laterally disposed ratchet faces 69b, 70b, 71b and 72b. Thus the indexing plate for coaction with a tap of the corresponding number of flutes is selected and installed on the tap-grinding fixture for controlling the movement of the tap in an eccentric path for presentation to the grind wheel 34 illustrated in Fig. 24. The grinding operation is effected by movement of the faces of the tap with respect to the grinding wheel through a very precise predetermined path determined by the coaction of the adjustable eccentric sleeves 21 and 22 under control of calibrations 30a and 31a and set screw 33, the setting of the cylindrical tube assembly 20 within the bore of the body structure 15 under control of set screw 14b and calibrations 14a and 10a, and the adjustment of the body structure 15 with respect to the ring member 10 through the adjustment of securing screws 11a and 12a. The tap is moved in an orbital path for effecting the precision grinding of the faces of the tap.

Fig. 7 illustrates a modified application of the tap-grinding fixture of my invention in which the tap-grinding fixture is oriented about the circular head 6 by adjustment of adjustable screw 8 to move the tap-grinding fixture and body structure to an inclined position and present the tap 29 to the grinding wheel 34 in a position for grinding between the threaded faces of the tap. The calibrations 6a and 7a as well as the previously referred to calibrations 10a, 14a, 31a and 30a all coact to permit the tap to be presented in proper position with respect to the grinding wheel.

The base 2 carries on its rear side, represented in position 2a shown in Fig. 6, a calibration which registers with graduations 4a carried on the rear circular surface of the bracket 4 so that the angular disposition of the spindle above the base 2 may be set with a high degree of precision by loosening pintle screw 5 and orienting bracket 4 about the support 2 to a predetermined position according to the relationship of calibrations 2a and graduations 4a. Thus further provision is made for the accurate setting of the fixture through the coaction of the four sets of calibrations and graduations 2a—4a; 6a—7a; 10a—14a; and 31a—30a.

In the operation of the radial clearance tap-grinding fixture of my invention I select the particular indexing plate intended for the tap of the corresponding number of flutes and install this indexing plate on the fixture as heretofore explained. The tap, of the number of flutes corresponding to the indexing plate, is mounted in the jaws 28 of the chuck 25 by use of a wrench having teeth engaging the rack 26. While the tap is loosely engaged in the chuck and capable of axial orientation, the gage, corresponding to the primary number of flutes of the tap, is utilized as illustrated in Figs. 1 and 2, and as described more fully in my copending application Serial No. 334,247, filed January 30, 1953, for orienting the tap to the required grinding position. The tap is now in a position to be presented to the grinding wheel illustrated in Figs. 7 and 24, after the setting thereof by use of graduations 2a—4a, 6a—7a, 30a—31a, and 10a—14a. Having thus set the tap for grinding, successive grinding operations are effected by successive movements of the actuating plate 36 by grasping handgrip 43a of actuating lever 43. By reason of the selection of the proper indexing plate the tap is oriented through the proper angular distance for accurately grinding the several faces of the tap.

The tap-grinding fixture of my invention has been found to be very practical and efficient in operation. While I have described my invention in certain of its preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. A tap-grinding fixture comprising a support, a bracket revolvably mounted on said support and terminating in a vertically disposed head, a coacting bracket terminating in a vertically disposed head aligned with the aforesaid head, said coacting bracket terminating in a circular head disposed in a plane extending substantially normal to the plane of said last-mentioned head, a body structure having an end flange, means extending through said circular head and engaged in said end flange for adjustably fixing the position of said body structure, said body structure having longitudinally extending bore therethrough, a cylindrical tube assembly mounted in said bore, said cylindrical tube assembly including a pair of coacting inner and outer eccentric sleeves adjustable one with respect to another, a chuck spindle carried by said inner sleeve and projecting beyond opposite ends of said sleeves, an actuating disc mounted on said outer sleeve adjacent the end of said body structure, an indexing plate mounted on said spindle adjacent said actuating disc, an operative connection between said actuating disc and said indexing plate, and means carried by said body structure and coacting with said actuating disc and said indexing plate for controlling the movement of said chuck spindle in an orbital path.

2. A tap-grinding fixture comprising a support, an angularly shiftable bracket adjustably mounted on said support, said bracket terminating in a vertically extending head offset from the adjustable mounting position of said bracket, a coacting circular head adjustably mounted on said bracket and having a horizontally extending arm connected therewith and terminating in a circular portion disposed in a plane extending substantially normal to the plane of the aforementioned circular head, a body structure adjustably mounted on said circular portion of said arm and in a position substantially axially aligned with the adjustable mounting of said first-mentioned bracket on said base, said body structure having a longitudinally extending bore therein, a cylindrical tube assembly consisting of inner and outer eccentric sleeves adjustable with respect to each other, said outer sleeve being revolvably mounted in said bore, a chuck spindle mounted in said inner sleeve and projecting through opposite ends of said sleeves, the chuck spindle at one end thereof carrying tap-gripping means and means interposed between said body structure and the other end of said chuck spindle for imparting increments of angular movement to said chuck spindle in an orbital path determined by the mutual adjustment of said eccentric sleeves.

3. A tap-grinding fixture, as set forth in claim 2, in which said eccentric sleeves terminate at one end thereof in circular flanges which carry calibrations and graduations thereon, said sleeves being selectively orientatable in accordance with readings determined by said calibrations and graduations for controlling the orbital path of the tap carried by the chuck spindle through the angular increments of movement thereof.

4. A tap-grinding fixture, as set forth in claim 2, in which said last-mentioned means comprises an actuating disc for imparting angular movement to said cylindrical tube assembly and an indexing plate for determining the paths of successive angular movements of said cylindrical tube assembly.

5. A tap-grinding fixture, as set forth in claim 2, in which said last-mentioned means comprises a pair of members, one of said members being secured to said outer eccentric sleeve and the other of said members being secured to the projecting end of said chuck spindle, means for applying an angularly movable force to said first-mentioned member and means carried by said second-mentioned member for governing the path of angular movement of said first-mentioned member.

6. A tap-grinding fixture, as set forth in claim 2, in which said last-mentioned means comprises an actuating disc and an indexing plate, said actuating disc being secured to said outer eccentric sleeve and said indexing plate being secured to said chuck spindle, said body structure having a bracket member connected therewith and projecting over the path of movement of said actuating disc and said indexing plate, an inwardly directed stop member mounted in said bracket member in alignment with said actuating disc, an abutment stop and an attachable and detachable bar carried by said actuating disc and coacting with said aligned inwardly directed stop member for selectively controlling the orbital path of movement of said chuck spindle, a spring-biased detent carried by said bracket member in alignment with said indexing plate and ratchet means carried by said indexing plate and coacting with said spring-biased detent for arresting the movement of said chuck spindle during the increments of angular movement of said actuating disc.

7. A tap-grinding fixture, as set forth in claim 2, in which the last-mentioned means comprises an actuating disc secured to the outer eccentric sleeve and an indexing plate secured to the projecting end of said spindle, said actuating disc having a transversely extending spring-actuated detent thereon and said indexing plate including ratchet teeth on the side thereof adjacent said actuating disc for engaging said spring-actuated detent, whereby increments of movement imparted to said actuating disc impart corresponding increments of movement, step by step, to said indexing plate for moving said chuck spindle in an orbital path determined by the eccentricity of said cylindrical tube assembly and means carried by said body structure and coacting with both said actuating disc and said indexing plate for selectively determining the amplitude of the increments of angular movement of said chuck spindle.

8. A tap-grinding fixture, as set forth in claim 2, in which said last-mentioned means includes an actuating disc secured to said outer eccentric sleeve and an indexing plate secured to the projecting end of said chuck spindle, said actuating disc having a plurality of spaced transverse grooves on the periphery thereof for receiving an attachable and detachable bar, a bracket member carried by said body structure and extending over said actuating disc and said indexing plate, an inwardly directed stop carried by said bracket member and coacting with said abutment stop and said selectively positioned bar for determining the amplitude of angular movement of said cylindrical tube assembly, a spring-actuated detent extending transversely of said actuating disc, ratchet teeth carried by said indexing plate and coacting with said spring-actuated detent on said actuating disc, ratchet faces on the periphery of said indexing plate and a spring-operated detent carried by the bracket member on said body structure and coacting with the ratchet faces on said actuating plate for arresting the rotation of said chuck spindle during the increments of movement of said actuating disc.

9. A tap-grinding fixture, as set forth in claim 2, in which the circular portion of said horizontally extending arm and said body structure carries calibrations and graduations thereon and means interconnecting the said circular portion of said arm with said body structure for securing said body structure in a selected predetermined oriented position with respect to said horizontally extending arm.

10. A tap-grinding fixture, as set forth in claim 2, in which the vertically extending head of said first-mentioned bracket and the coacting circular head on said horizontally extending arm are each provided with calibrations and graduations for setting said arm in a predetermined angular position with respect to said bracket for controlling the tilt of said chuck spindle with respect to the support.

11. A tap-grinding fixture, as set forth in claim 2, in which said angularly shiftable bracket and said support are both provided with calibrations and graduations for predetermining the setting of said angularly shiftable bracket on a vertical axis with respect to said support and correspondingly controlling the position of said body structure with respect to said support.

12. A tap-grinding fixture, as set forth in claim 2, in which said last-mentioned means includes an actuating disc secured to said outer eccentric sleeve and an indexing plate detachably secured to the projecting end of said chuck spindle, said actuating plate having a transversely disposed spring-actuated detent therein directed toward said indexing plate, said indexing plate having transverse grooves in the periphery thereof, dual ratchet members detachably mounted in the said grooves, each of said dual ratchet members having a ratchet face projecting from the side thereof toward said actuating disc and in the path of movement of the spring-actuated detent carried thereby and having outwardly projecting ratchet faces on the periphery thereof and means carried by said body structure and coacting with said actuating disc and said indexing plate for governing the increments of angular movement of said actuating disc and said indexing plate.

References Cited in the file of this patent

UNITED STATES PATENTS

| Number | Name | Date |
|---|---|---|
| 1,075,285 | De Leeuw | Oct. 7, 1913 |
| 1,249,629 | Isler | Dec. 11, 1917 |
| 1,698,807 | Willhauck | Jan. 15, 1929 |
| 1,917,504 | Curtis | July 11, 1933 |
| 1,981,174 | Hille | Nov. 20, 1934 |
| 2,040,709 | Pruitt | May 12, 1936 |
| 2,352,489 | Melin | June 27, 1944 |
| 2,480,618 | Tresidder | Aug. 30, 1949 |
| 2,486,044 | Lusk | Oct. 25, 1949 |
| 2,554,689 | Warfel | May 29, 1951 |
| 2,578,842 | Rollason | Dec. 18, 1951 |